Dec. 6, 1960  J. J. KANTER ET AL  2,962,727
VALVE MECHANISM FOR TANKS OR THE LIKE
Filed April 11, 1957  3 Sheets-Sheet 1
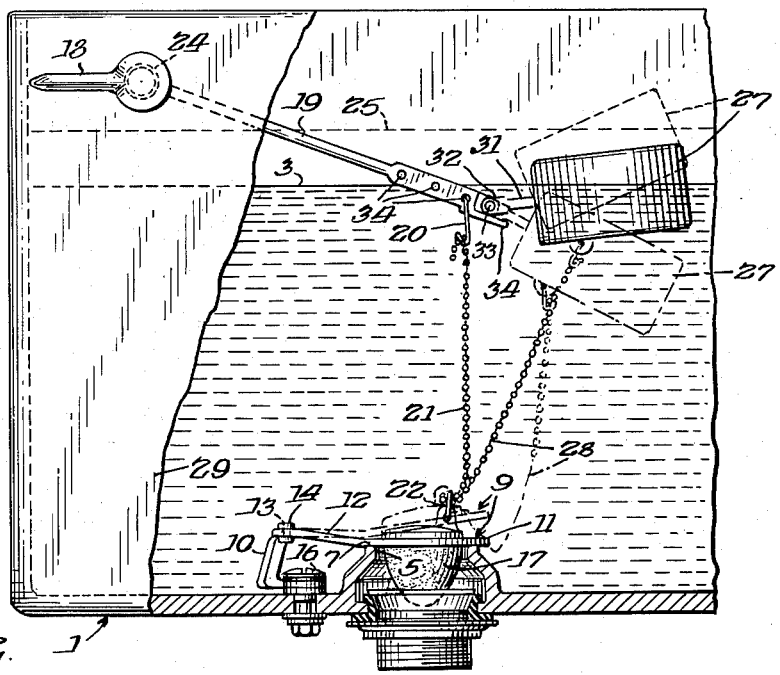
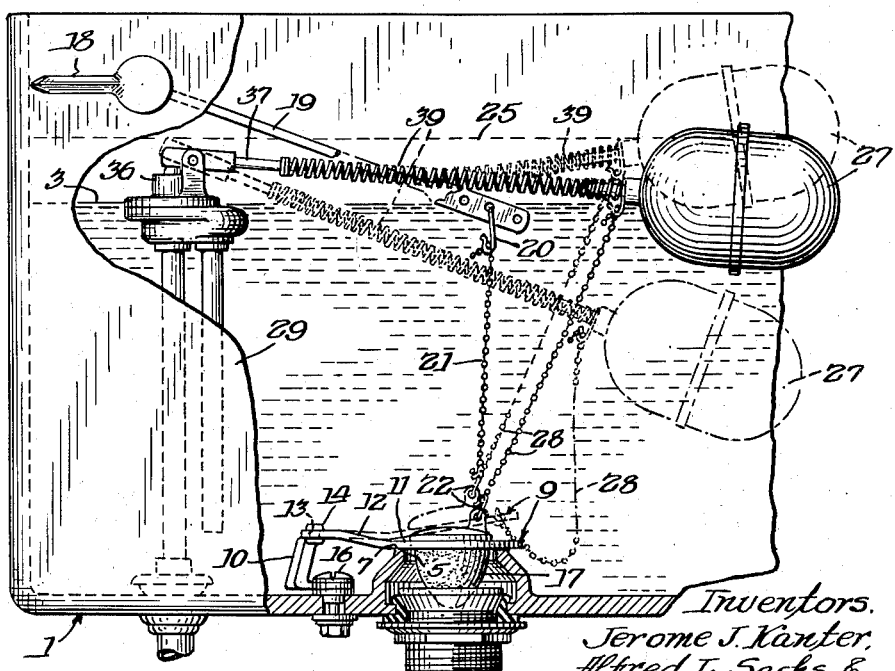
Inventors.
Jerome J. Kanter,
Alfred L. Sachs, &
Carl U. Larson.
By Joseph O. Lange
Atty.

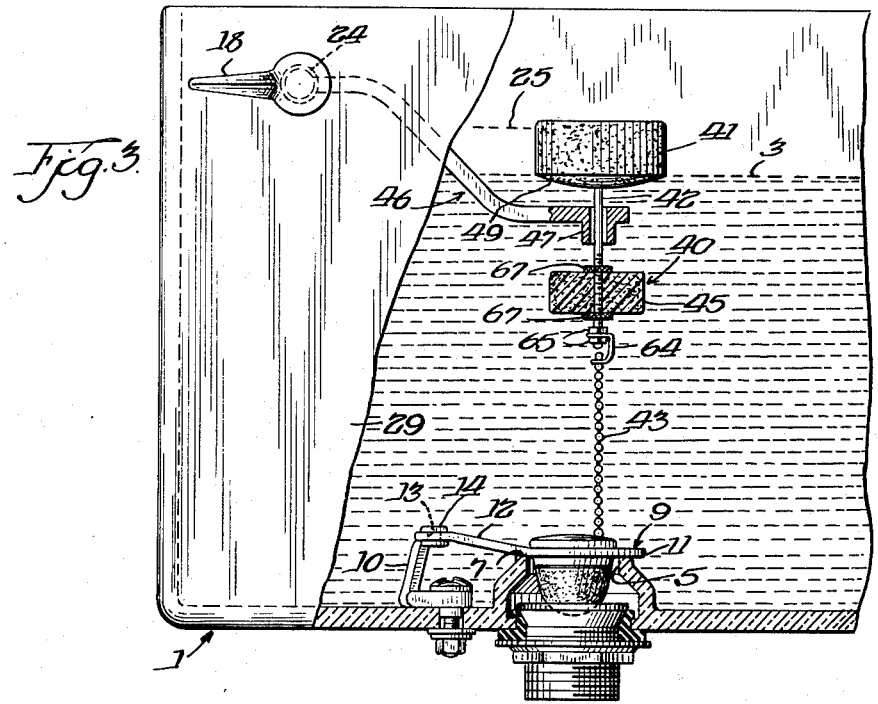
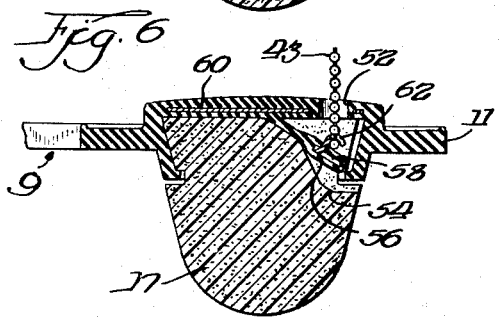
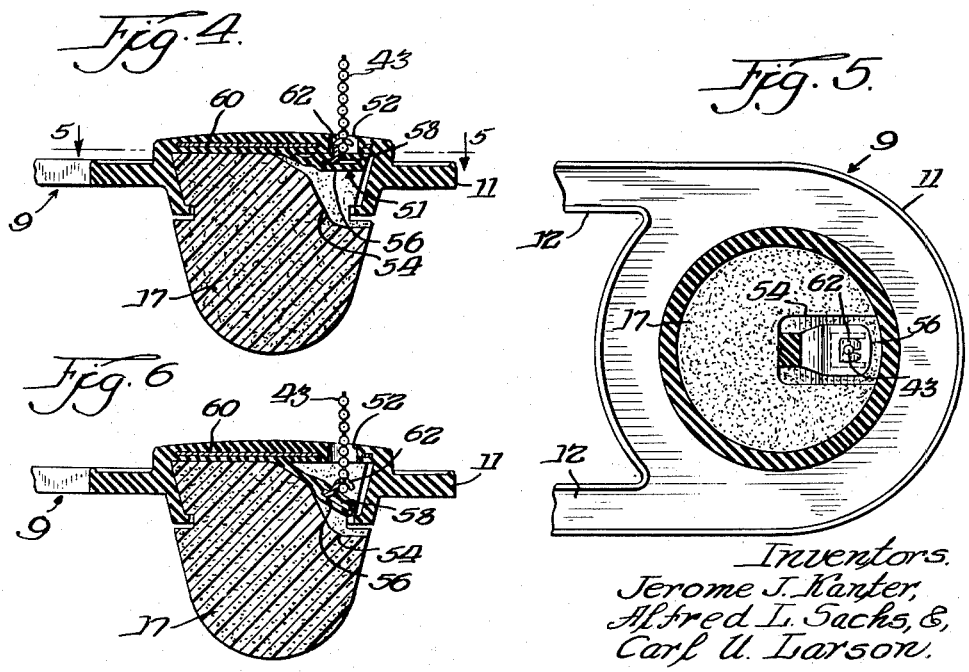
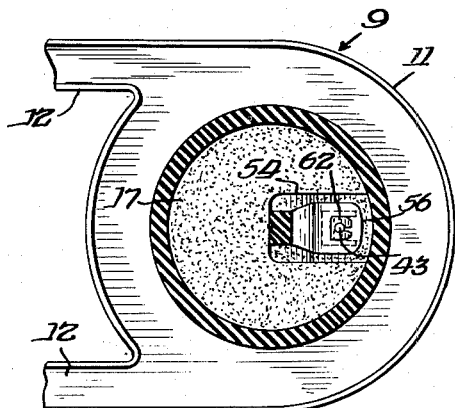

Dec. 6, 1960 J. J. KANTER ET AL 2,962,727
VALVE MECHANISM FOR TANKS OR THE LIKE
Filed April 11, 1957 3 Sheets-Sheet 3

Inventors.
Jerome J. Kanter,
Alfred L. Sachs, &
Carl U. Larson.
By Joseph O. Lange
Atty.

United States Patent Office 2,962,727
Patented Dec. 6, 1960

2,962,727

VALVE MECHANISM FOR TANKS OR THE LIKE

Jerome J. Kanter, Palos Park, Alfred L. Sachs, Chicago, and Carl U. Larson, Berwyn, Ill., assignors to Crane Co., Chicago, Ill., a corporation of Illinois Filed Apr. 11, 1957, Ser. No. 652,281

3 Claims. (Cl. 4—67)

This invention relates to valve mechanisms for tanks or the like, particularly to such mechanisms for flush tanks of the type used with water closets, although it will be apparent that it may also have other applications.

It is an important object of the present invention to provide means for automatically moving an outlet or discharge valve in a tank from the fluid sealed closed valve condition upon the attainment of a predetermined liquid level within the tank, said means comprising float means attached to said valve member.

It is another object to provide novel means for effecting overflow relief in a tank without the use of an overflow tube or equivalent passageway.

It is yet another object to provide manually operative means for normally opening an outlet valve in a tank and additional means automatically moving the outlet valve from the fluid sealed closed valve condition upon the attainment of a predetermined liquid level within the tank, the said additional means comprising float means attached to said valve member.

It is still another object to provide manually operative means for opening an outlet valve in a tank at a normal liquid level and relief means for automatically moving the valve at least partially from its seat upon the attainment of a predetermined liquid level above the normal level, said relief means comprising buoyant means attached to said valve member.

A further object is to provide means permitting partial flow through an outlet valve prior to attainment of a predetermined liquid level within the tank. The latter object is particularly significant in connection with water closet flush tanks because the means, as will hereinafter become apparent, provides for the desired refill in the closet bowl without the need of the usual refill tube or channel within the tank. The refill tube or channel is also not needed for overflow purposes inasmuch as overflow relief is provided in accordance with the previous objects. Therefore the conventional overflow tube or channel can be dispensed with.

Still another object is to provide an outlet valve containing a passageway for partial flow therethrough and an auxiliary valve actuatable into sealed relation with the outlet valve at a predetermined liquid level in the tank, the auxiliary valve being so actuated automatically by float means.

Yet another object is to provide a tank and outlet valve having a flow passage closable by a float actuated auxiliary valve at a predetermined liquid level in the tank in combination with additional float means effective to raise the outlet valve at a predetermined liquid level above the first level for over-flow relief as will hereinafter become apparent.

It is a further object to provide in certain forms for the auxiliary valve actuating float and additional float means to constitute a unitary float means.

It is still a further object to provide means for selectively raising the outlet valve from its seat through the unitary float means by virtue of its attachment to the outlet valve.

Other objects and advantages will become more readily apparent upon proceeding with the following description, read in the light of the accompanying drawing, in which Fig. 1 is a fragmentary sectional assembly view of a flush tank valve mechanism employing the present invention.

Fig. 2 is a view similar to Fig. 1 but showing another form of the said invention.

Fig. 3 is an assembly view similar to Fig. 1 showing a further embodiment of the present invention.

Fig. 4 is an enlarged detail showing of the tank outlet valve taken in vertical section through the center thereof.

Fig. 5 is a sectional view taken along the lines 5—5 of Fig. 4.

Fig. 6 is a view similar to Fig. 5 showing the auxiliary valve in open position.

Similar reference numerals refer to similar parts throughout the several views.

Figure 8:
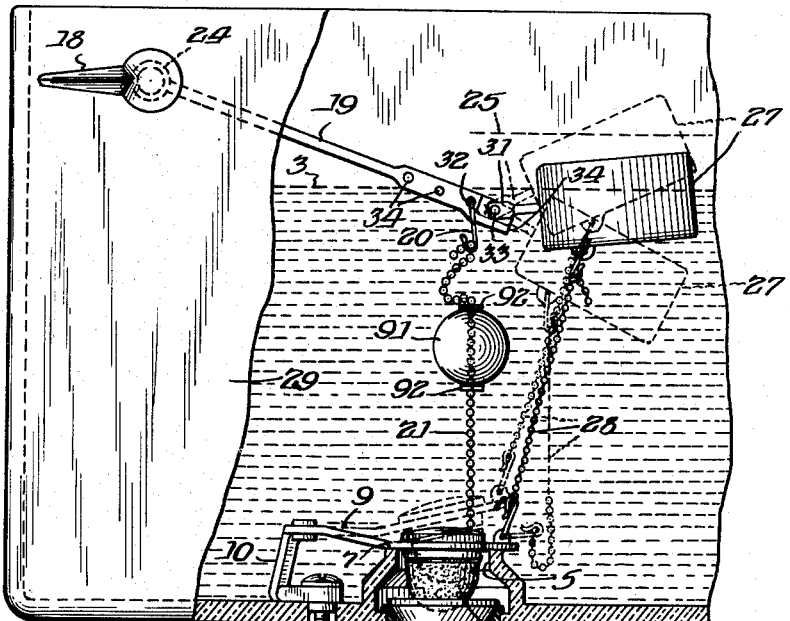
Fig. 8 is a view similar to Fig. 1 showing yet another form of the present invention.

Referring to the drawing in detail, as illustrative of the present invention and application thereof, and directing our attention first to Fig. 1, the numeral 1 generally designates a flush tank as used with water closets for instance, said flush tank being provided with the usual float supply valve or ballcock (not shown) adapted to allow the filling of the tank to a normal full tank level such as designated by the numeral 3, at which level the float actuated supply valve normally shuts off.

The flush tank is also provided with an outlet port 5 through which the tank liquid may discharge. The top of the port is defined by an annular seat surface 7 for effecting substantially flat seating engagement of a flapper type closure member 9 mounted by means of a mounting post 10 to the floor of the flush tank. The details of the closure member other than that embraced in the present invention and of the mounting post may be found in U.S. Patents Numbers 2,756,437, granted July 31, 1956, and 2,822,552, granted February 11, 1958. Briefly, the closure member 9 is constructed of a piece of flexible material such as rubber or the like and comprises a forward closure portion 11 spanning the ported seat 7 in the closed valve position shown in full lines in the drawing and a rearward portion 12 having a transversely extending slot 13 for distortion or stretching over the enlarged button head 14 at the top of the mounting post 10. The mounting post is secured to the bottom of the tank by means of a bolt 16 with suitable means (not shown) to prevent rotation of the mounting post about its point of attachment. The closure member also preferably includes a float portion 17 depending from the lower surface of the closure portion 11 which is received within the outlet port in the closed valve position. For details of this part of the construction, see Patent No. 2,756,437.

The closure member is adapted to be raised from the closed position by means of the usual lever rod and handle, 18 and 19 respectively, to the latter of which is connected as by a wire clip 20 a flexible cord or bead chain 21 for attachment to the closure member as by suitable clip means 22. It will of course be understood that the handle 18 is depressed so as to lift the lever 19 and attached bead chain for initiating the tank flushing action, the closure member 9 being raised from the closed position into a condition of self-sustained buoyancy by reason of the depending float element of the closure member.

It should of course be understood that although normally the supply valve or ballcock (not shown) closes off at a flush tank level such as level 3 shown, the said supply valve sometimes fails to shut off completely because of deterioration or wear of the closure member or seat surface therein. When this condition occurs the level of the water is allowed to rise above the normal tank level 3 and inasmuch as it is impossible for such defective or worn valve to shut off completely, relief means such as a conventional overflow tube or the equivalent passageway in the side of the tank (not shown herein) is necessary to limit the rising water positively to a particular level so as to prevent the water from flowing out through the lever operator opening 24 or through the top of the tank onto the floor. Dotted line 25 indicates the usual high water level which the water is permitted to reach before being allowed to flow off through such overflow tube.

The present invention is partly directed to novel means other than the usual overflow tube or channel for predeterminately limiting the amount of water level rise within the tank due to a faulty supply valve so as to prevent the tank contents from overflowing or leaking upon the floor. This means comprises basically the use of buoyant means such as a float member 27 which normally floats on the surface of the tank water, said float member being connected with the outlet member 9 by means of a flexible cord or bead chain 28. It should be noted that the latter bead chain is in a taut condition when the flush tank is at the normal water level 3, and that the float member 27 is slightly more submerged than it would otherwise be if free floating. This is important in that this relation allows the float member to act more promptly in raising the closure member from its seat as the water level rises above the normal level. It should also of course be appreciated in connection with the normal water level that the same is not necessarily the level indicated in the drawing inasmuch as the float rod arm of the ballcock (not shown) is commonly bent up or down by the plumber or householder so as to adjust the normal full tank level to produce the particular quantity of water desired for the flushing action. However, it is preferred that the chain 28 be in at least a slightly taut condition and the float member 27 in a more submerged condition than it would otherwise be if free floating at whatever normal water level the tank is adjusted. The bead chain 28 may of course be adjustable on the wire clip member 22 for the proper length. Preferably also in this connection the chains 21 and 22 may in fact be a single continuous chain adjustable at both the upper and lower clips 20 and 21 for the proper valve action. For the adjustable clip member 20, see No. 2,781,521.

In operation, it should be evident that as the water level rises above the normal water level such as 3 the float member 27 will tend to rise and take out any slack that may be present in the bead chain 28. Further raising of the tank water level will not produce any further movement of the float member inasmuch as the latter is held down by the taut chain which is connected to the closure member 9. As the water level continues to rise, however, the float member will become more and more submerged, which will cause an increasingly greater pull on the closure member through the chain 28. When the water level finally rises to a predetermined level such as indicated at 25 sufficient pull will then have been applied to the closure member by the submerged float 27 (still approximately in the full line position shown) to cause the closure member or at least the forward flexible portion thereof to lift sufficiently from the fluid sealed closed valve position shown in full lines to permit a substantial rate of water discharge from the flush tank through the outlet ports.

It should of course be understood that the amount of opening of the valve closure member depends upon the water level actually reached which again depends upon the rate of leakage or flow of the water in through the defective or malfunctioning supply valve or ballcock. If the water rises relatively rapidly the float will tend to raise the closure member a much greater amount for a greater rate of discharge or relief flow than for instance if the leakage is at a slower rate representing a somewhat lower high level mark. In the latter case of course the float may barely crack the outlet valve so as to permit a relatively slight escape or reduced rate of outflow sufficient to balance the amount of in-flow because of the ballcock leakage.

Thus it is apparent that where there is leakage through the supply valve due to failure of the same to shut off tightly because of wear and deterioration the float member 27 will cause a slight raising of the outlet valve sufficient to bleed or relieve the additional supply of water through the outlet port so as in effect to retain the valve closure in a partially open or suspended condition such as that shown in the dotted lines in Fig. 1. Such continual leakage through the outlet port and into the water closet will of course be noticeable to the occupants of the building who should then repair the faulty supply valve. The position of the float member 27 corresponding to the raised condition of the closure member illustrated is shown in the upper dotted lines of the float member.

The basic idea of this part of the invention envisions the use of a float member suitably attached to a tank outlet valve of the swinging type shown or of a vertically actuated closure member which is effective to move or raise the latter from fluid sealed closed position upon the attainment within the tank of a predetermined higher water level. The predetermined level of course will be sufficient to crack or just open slightly at least a forward portion of the flat seating closure member shown, the level of course being higher for a greater degree of opening of the valve as representing a greater degree of water leakage.

In order to prevent such a float member, however, which could otherwise be free within the tank except for the chain 28, from becoming caught between the lever 19 and the front face 29 of the tank or becoming entwined around the chain 21 or float rod arm of the ballcock (not shown) when the flush tank is being discharged and refilled, it is desirable that there be provision to confine or restrain the float member in its movement so as to prevent such lodging or entwining.

Fig. 1 illustrates means of so limiting the float member without restricting and hampering it in its function of raising the closure member for relief purposes. This means comprises supporting the float member, which is preferably of flat disc form for greater buoyancy effect, on a relatively short arm 31 having a slotted or bifurcated end 32 pivotally attached to the lever arm 19 as by means of a pin 33 extending through the lower-most of a series of apertures 34 in the end portion of the lever 19. This pivotal connection which is free and unbinding permits the float 27 to float substantially on the surface of the water in the normal full tank condition represented by the level 3 and also to lift under the action of the rising water level for the relief action while at the same time the connection permits a momentary oscillation or raising of the point of pivot 33 upwardly when the handle 18 and lever 19 is actuated enabling the float to remain substantially in its original prior position except for slight rotation in the water. In this manner the float member 27 does not need to be raised out of the water upon raising of the lever 19 as would be the case were the float member rigidly attached to the lever arm 19, this arrangement permitting jack-knifing at the point of connection while not appreciably disturbing the condition of the float member.

It should also be noted in the form shown in Fig. 1, in order to prevent collapsing or swinging of the float member past the center and under the lever arm 19 in the course of tank discharge so as to lodge thereunder during filling, that a stop element 34 has been provided to limit the lower position of the float member to the lower dotted line position shown in the drawing.

Arrangements may of course be had, other than the pivotal connection shown in Fig. 1, as for instance, the float could be suitably housed or contained within a special shielding or retaining structure. Fig. 2 also illustrates another arrangement for limiting the movement of the float member so as to prevent lodging or entwining as previously noted, in this case the float member 27 actually also being the float member used for actuating the ballcock or supply valve 36. The float member 27 is connected to the closure member 9 in the same manner as previously indicated; namely, by the use of a bead chain 28. The float is also connected to the float rod arm 37 by means of a coil spring 39 of quite stiff and rigid nature, said latter spring portion permitting tight shutting of the ballcock 36 upon the filling of the water within the tank to the normal level 3 where the ballcock is in a good state of repair and capable of a tight shutoff. Where, however, through a defective or worn ballcock the water in the tank rises beyond the normal water level to the level 25, for instance, so as to cause submergence of the float member 27, the coil arm 39 will be sufficiently flexible to permit slight yielding as indicated in the upper dotted line position of the float and lever arm so as to permit the application of a load and movement of the closure member into at least a partially open position for relief of the overflow in the manner previously indicated in the connection with Fig. 1.

It should of course be understood in connection with both drawing figures that should the rate of water rise beyond the normal water level 3 be exceedingly great, it is possible for the float member 27 to raise the flapper or other type of closure member sufficiently to bring the same into a condition of self-sustained buoyancy similar to that which is achieved by use of the operating handle and lever 18 and 19.

Figures 3 through 6 are directed to a preferred form of the total combination of the present invention. In the embodiment therein depicted, the float element 41 serves the same purpose as float 27 in the previous figures; namely, to serve as means for raising the outlet valve 9 at least partly from its seat by the rising of the water level in the tank to an overflow stage such as 25 due to a faulty or deteriorated supply valve or worn seat condition therein, through its connection with the outlet valve constituting the rod 42 and flexible chain 43. It should be pointed out that said float element as well as a lower float element 45, later to be explained, are preferably made of light weight impervious plastic such as foam polystyrene or foam polyethylene as pointed out in connection with float element 27 in Fig. 1.

The present float unit 40, as plainly appears, is adapted to be lifted vertically under the buoyancy of the float element 41, in conjunction with the lower float 45, for effecting the overflow relief, thus moving approximately in vertical reciprocating movement through the vertical bore or opening 47 in the actuating lever arm 46. The latter lever is equivalent to lever 19 in the previous figures and is manually actuable by means of the handle 18. The outlet valve 9 therefore may be selectively moved into a fully opened position of self-sustained buoyancy (because of the float element 17) by pressing down on the handle 18 which swings the lever 46 upwardly into contact with the domed bottom 49 of the float element 41, further movement raising the entire float unit 40 and its attached chain 43. It should of course be realized that when the handle 18 is released, the lever arm 46 immediately returns to the position shown in Fig. 3 and inasmuch as the tank water level rapidly falls in the course of the flushing operation, the float unit 40 promptly drops into a lowermost position represented by the lower surface 49 of the float element 41 resting on the lever arm 46. The lever arm 46 therefore forms a stop for the float unit as the tank is discharging or when emptied and prevents the chain 43 from becoming caught under the flat surface of the flapper member so as to prevent its proper closing when the water has discharged from the tank.

It should be noted in connection with both the overflow and manual actuation of the closure member that the chain 43 is not connected directly to said closure but rather is so connected through intermediate means 51 (see Fig. 4), to be described below. Besides the float unit 40 serving the purpose of overflow relief as already pointed out and also as a connecting member for mechanical actuation of the outlet valve, this unit also serves an additional and very important function now to be described.

In the ordinary water closet flush tank, it is essential that there be means for the supply of a predetermined quantity of water to the water closet after the flushing operation has terminated and the outlet valve has closed. This additional quantity of water allowed to flow into the toilet bowl after said flushing operation has ceased is known as refill and is for the purpose of forming a water seal in the trap formation of the water closet in order to prevent the escape into the room of sewer gases.

Such additional quantity of water or refill is conventionally supplied through an overflow tube or channel rising above the normally full tank water level and communicating with the outlet port below the seat surface thereof, said overflow tube receiving water flow from the supply valve by means of a refill tube directed to discharge into the mouth thereof. The overflow tube normally terminates at a level such as 25 for receiving overflow liquid due to any defect or deterioration of the supply valve to prevent flooding on the floor. The normal overflow tube thus serves a dual role of receiving refill liquid during the tank filling operation and also overflow liquid as a result of faulty operation of the supply valve.

In the present instance, as has already been shown, the need for such a tube for overflow purposes has been eliminated. In order to provide for the necessary refill without requiring the use of such a tube for this purpose, the outlet valve has been provided with an opening or port 52 through the top of the valve and the float element 17 of this valve has been relieved at 54 to provide a certain flow of liquid through the valve when resting on the outlet seat 7. The purpose of this passageway through the valve as has been indicated is to provide the necessary refill in the closet bowl, its size being sufficiently large to accomplish the same during the limited time available, as will appear below. According to this phase of the invention the outlet valve 9 is provided with an auxiliary valve 56 of a flat seating flapper type which is molded integrally with the outlet valve or cemented or otherwise affixed thereto for fluid sealed engagement against the underside of the outlet valve around the opening or port 52 in the closed position of the auxiliary valve shown in Fig. 4. The auxiliary valve is provided with a stiffener member 58 preferably of metal molded therein adapted to extend marginally outwardly of the port 52 when the auxiliary valve is in the closed position for a purpose which will be apparent below. In this connection it should also be noted that the outlet valve 9 is also provided with a stiffener 60 preferably of metal and in accordance with Patent No. 2,787,004, the stiffener member in this case extending around the port 52 for support of the material therearound.

The stiffener member 58 in the auxiliary valve is provided with an upwardly directed finger 62 extending above the surface of rubber or composition of which the valve is formed and which is bifurcated or otherwise formed for ready engagement around the connecting element between adjacent beads of the bead chain 43 at the point of attachment to the chain. The extending finger and bead chain as evident from Fig. 4, extend within the port 52 in the closed position of the auxiliary valve, the chain being attached to the end of the rod 42 by suitable means such as a wire element 64 secured to the end of the rod by nuts 65 and which may engage between adjacent beads of the chain by means of a horizontally disposed hook formation within which the bead chain can resiliently snap and be easily withdrawn if desired for chain adjustment. The bottom of this element may be formed similarly to Patent No. 2,781,521.

As previously pointed out, the float unit 40 includes a lower float element 45. This element, which is adjustably mounted on the rod 42 by means of the knurled nuts 67, is adapted to exert an upward pull on the chain 43 in the course of tank filling and as a result of buoyancy therewithin to move said chain and attached auxiliary valve 56 upwardly from the Fig. 6 open valve position into the closed position shown in Fig. 4. At this point all slack will have been taken out of the chain 43 and the latter placed in a taut condition, the float element 45 being retained in a fixed position as the water level continues to rise therearound to subsequently totally submerge the same. The additional rise around the upper part of the float element 45 after the latter and attached chain 43 first draws the auxiliary valve into the closed position provides an additional loading on the auxiliary valve to insure fluid tight sealing with the outlet valve.

When the member 45 and the attached parts are drawn up to place the auxiliary valve in the closed position and thus terminate the period of refill flow through the port 52 and relief 54 in the outlet valve, the upper float element 41 will be raised at the same time above its resting place on the lever arm 46 into the position shown in Fig. 3. It is of course seen that the water in the tank continues to rise above the lower float 45 until the full tank level 3 approximately opposite the bottom of the large or the upper float 41 is reached. Further rising of the water level because of a stuck or defective supply valve or worn seat therein will of course tend to submerge the upper float element 41 and when sufficiently submerged the buoyancy therein, taken in conjunction with that of the lower float element 45 already submerged, will exert an upward force through the chain 43 and the auxiliary valve 56 so as to pull the outlet valve 9 at least slightly off its seat for overflow relief as described in connection with the Fig. 1 form. The stiffener members 58 and 60 are therefore provided to translate and receive the force between the small flapper and the large outlet valve without undue distortion of either the smaller flapper through the port 52 or the material around the port of the large flapper member. It was also pointed out that the lower float 45 is adjustably secured to the rod 42 and this is for the purpose of providing desired placement of the lower float element for effecting the proper quantity of refill liquid through the outlet valve for varying supply valve pressures in different installations.

It is thus seen that a combination unit has been provided in which selective mechanical outlet valve actuation may be had through the handle and lever, 18 and 46, while at the same time overflow and refill provision is automatically had without the use of the costly overflow tube or channel.

Figure 7:
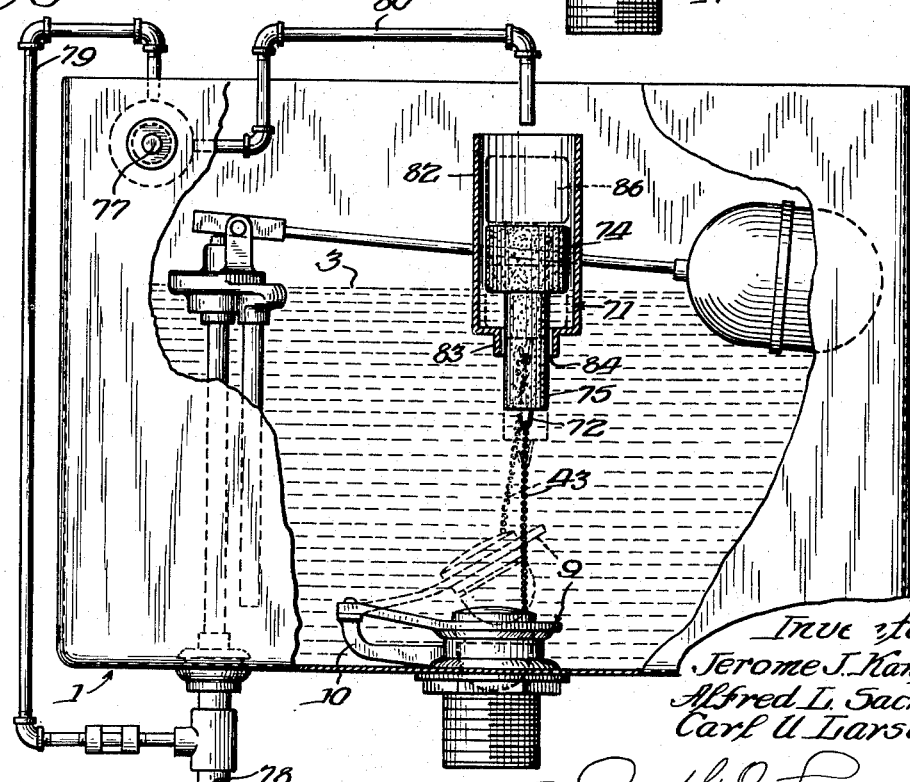
Fig. 7 shows another form of the present invention.

It is of course understood that other and equivalent forms of such a combination may be had, as for instance that shown in Fig. 7. In this case the outlet valve 9 is identical to that of Figs. 3 through 5, including the use of the auxiliary valve 56 shown in the latter form. The chain 43 in this case is attached to a single float member 71 by means of suitable wire element 72 extending from the bottom of the float as shown. The float member consists of an upper enlarged portion 74 and lower portion 75 forming in effect a downwardly stepped float member. The upper portion 74 is intended to function like that of the float element 41 of the last form and also float 27 in the Figs. 1 and 2 forms, when taken together with the buoyancy residing in the lower float portion 75, similar to that imparted by the element 45 in the last form; in other words, to afford overflow relief upon rising of the water level sufficiently above the normal tank level 3 to so actuate the float member as pointed out previously. The lower part of the float member is comparable to the lower element 45 of the last form and is adapted to place the float member in a state of buoyancy upon attainment of the tank water of a proper level so as to draw up the chain 43 and auxiliary valve 56 into the closed position previously described in connection with the last form.

In the present instance it should be noted that the mechanical lever 46 and handle 18 have been eliminated and in lieu thereof hydraulic means like that of copending application Serial No. 619,540, filed October 31, 1956, which shows a behind-the-wall tank, has been employed. Briefly, a push button actuated valve 77 is mounted on the front wall of the tank preferably of a delayed closing type so as to permit passage of a predetermined quantity of water from the supply line 78 and branch 79 through the discharge pipe 80 into the top of an inner tank 82 suitably supported on the tank. The latter inner tank 82 is of stepped formation, having a lower reduced portion 83 for surrounding the lower float portion 75. When actuation of the valve is desired the button 77 is pushed thus causing an additional quantity of water to be discharged within the inner tank 82 which, although free to flow out through the open bottom 84 and rather restricted space around the sides of the float member 71, enters at a much faster rate than it discharges thereby to rapidly build up the inner tank water level with a minimum amount of additional water through the pipe 80 so as to quickly place the float member 71 into a condition of buoyancy to raise the latter and the outlet valve 9 through the chain 43 into a condition of self-sustained buoyancy as indicated in the dotted lines. The position of the float member 71 to produce this result is indicated by the dotted lines at 86. It should of course be understood that there is sufficient clearance around the smaller portion 75 and larger portion 74 of the float 71 within the inner tank 82 to allow the desired drainage from the inner tank through the open bottom 84 during flushing and flow thereinto during filling of the flush tank 1 to produce the closing of the auxiliary valve 56 and also actuation of the float member for overflow purposes.

Although float 27 in the Fig. 1 form is connected directly to the outlet valve exclusively for overflow opening thereof, such float in the same or slightly modified portions, may be connected to said valve through an auxiliary valve like that of Figs. 4–6 in which case the float will rise from the lower or emptied, dotted line position shown in Fig. 1 substantially to the full line buoyant position shown pulling the attached auxiliary valve up into a closed position with the outlet valve and terminating the refill flow. Further water rise to the full tank level 3, while the float is retained in position by the chain 28, places a slight additional load on the auxiliary valve to insure its tightness. Water level rise above the full tank level 3 to approximately level 25 will of course produce overflow relief by moving the entire outlet valve at least slightly off its seat. In such a construction the chains 21 and 28 could be joined at the bottom into a single chain for connection with the auxiliary valve member or chain 28 attached to the auxiliary valve and chain 21 attached directly to the outlet valve.

Or, if desired, the float 27 may be connected directly to the outlet valve, as at the front shown in Fig. 8, for overflow relief solely as in Fig. 1, and the chain 21 connected to the auxiliary valve 56 and supporting an additional float member 91 (see Fig. 8) for lifting the chain and attached auxiliary valve into the Fig. 4 closed position to terminate the refill flow. The additional or refill float 91 may be secured on the chain by means of suitable wire clip elements 92 and the float adjustable in vertical position on the chain by removal and reapplication of the clip elements in order to obtain the desired quantity of refill liquid commensurate with the inlet pressure at the supply valve which controls the rate of supply valve flow into the flush tank.

Although certain embodiments of the invention have been disclosed, it should of course be that still other embodiments and variations of form may be had and that the appended claims should accordingly be liberally construed and limited only by their terms in view of the broad spirit of the invention and the cited art.

We claim:

1. In a tank or the like including an outlet opening and a seat surface therearound, an outlet valve for closing off said outlet opening in the closed valve condition, said outlet valve having passage means for permitting limited flow of tank liquid from above the outlet opening downstream therefrom when the outlet valve is in engagement with said seat surface, said passage means comprising a port extending through at least a portion of said outlet valve, auxiliary valve means upwardly movable into substantial fluid sealed engagement with an undersurface of said outlet valve around said port for closing off liquid flow through said passage means, buoyant means connected to said auxiliary valve means effective to move the latter into the sealed engagement with the said outlet valve to thereby place the outlet valve in a wholly closed condition upon the liquid reaching a predetermined level in the tank above said passage means and additional buoyant means connected to said outlet valve effective with said first named buoyant means to move the outlet valve at least partly from said seat surface for liquid flow into the outlet opening upon the liquid reaching a predetermined level above the first predetermined level.

2. In a tank or the like including an outlet valve, operable means for moving said outlet valve into an open position and additional means effective to move at least a portion of said valve from the fluid sealed closed valve condition upon the attainment of a predetermined liquid level within the tank, said additional means comprising buoyant means operatively connected to said outlet valve, said operable means comprising lever means connected adjacent the end to said outlet valve for moving the latter into an open position upon movement of the lever means, said buoyant means being connected to said lever means so as to effect at least lateral positioning of the said buoyant means.

3. In a tank or the like including an outlet opening and a seat surface therearound, an outlet valve for closing off said outlet opening in the closed valve condition, said outlet valve having passage means for limited flow of tank liquid from above the outlet opening downstream therefrom when the outlet valve is in engagement with said seat surface, said passage means comprising a port extending through at least a portion of said outlet valve, auxiliary valve means upwardly movable into substantial fluid sealed engagement with an undersurface of said outlet valve around said port for closing off liquid flow through said passage means, and buoyant means flexibly connected to said auxiliary valve means effective to move the latter into the sealed engagement with the outlet valve upon the liquid reaching a predetermined level in the tank above said passage means and to move said outlet valve by means of said auxiliary valve bearing thereon at least partly from the said seat surface thereby to effect liquid flow into the outlet opening upon the liquid within the tank reaching a predetermined level above the first predetermined level, said buoyant means being of a construction which moves in operation as a unit, said buoyant means comprising a plurality of buoyant members in substantial axial alignment.

References Cited in the file of this patent

UNITED STATES PATENTS

| 747,628 | Morrison | Dec. 22, 1903 |
| 1,087,940 | Graham | Feb. 24, 1914 |
| 2,214,439 | Robertson | Sept. 10, 1940 |
| 2,767,406 | Bennett | Oct. 23, 1956 |
| 2,787,004 | Zinkil | Apr. 2, 1957 |